(12) United States Patent
Lagerweij

(10) Patent No.: US 6,474,739 B1
(45) Date of Patent: Nov. 5, 2002

(54) SEAT TRACK ASSEMBLY FOR FOLD AND FLIP SEAT

(75) Inventor: Richard Allen Lagerweij, Thornton (CA)

(73) Assignee: Duea Global technologies, Rochester Hills, MI (US)

( * ) Notice: Subject to any disclaimer, the term of this patent is extended or adjusted under 35 U.S.C. 154(b) by 0 days.

(21) Appl. No.: 09/691,335

(22) Filed: Oct. 18, 2000

(51) Int. Cl.[7] .................................................. B60N 2/12
(52) U.S. Cl. ................ 297/341; 297/344.1; 297/378.12
(58) Field of Search ............................. 297/341, 344.1, 297/378.12

(56) References Cited

U.S. PATENT DOCUMENTS

| | | | | |
|---|---|---|---|---|
| 3,811,726 A | * | 5/1974 | Muraishi et al. ............ | 297/341 |
| 3,940,182 A | * | 2/1976 | Tamura ....................... | 297/341 |
| 4,639,038 A | * | 1/1987 | Heling ........................ | 297/341 |
| 4,881,774 A | * | 11/1989 | Bradley et al. ............. | 297/341 |
| 5,020,853 A | * | 6/1991 | Babbs ......................... | 297/341 |
| 5,352,019 A | * | 10/1994 | Bauer et al. ................ | 297/341 |
| 5,597,206 A | * | 1/1997 | Ainsworth et al. ..... | 297/378.12 |
| 5,605,377 A | * | 2/1997 | Tame .......................... | 297/341 |
| 5,707,112 A | * | 1/1998 | Zinn ....................... | 297/378.14 |
| 6,010,190 A | | 1/2000 | Downey | |
| 6,106,067 A | * | 8/2000 | Zhuang et al. ........... | 297/361.1 |
| 6,250,704 B1 | * | 6/2001 | Garrido .................... | 297/65.05 |
| 6,254,188 B1 | * | 7/2001 | Downey ..................... | 297/341 |

* cited by examiner

Primary Examiner—Peter M. Cuomo
Assistant Examiner—Joseph Edell
(74) Attorney, Agent, or Firm—Casimir R. Kiczek

(57) ABSTRACT

A seat includes a pivotable mount and a release member movable between a normal position wherein a locking device is in a locked position and a release position wherein the locking device is in an unlocked position. A bypass link moves the release member to the release position when a seat back pivots to a fully folded position and a movable track is in a predetermined release position so that the movable track moves to a predetermined memory position. When the movable track is in the predetermined memory position, the bypass link moves independently of the release so that the bypass link enters a bypass position, and the release member is in the normal position, when the seat back is in the fully folded position. Thus, the fully folded and locked seat can be flipped to a stowed position.

21 Claims, 13 Drawing Sheets

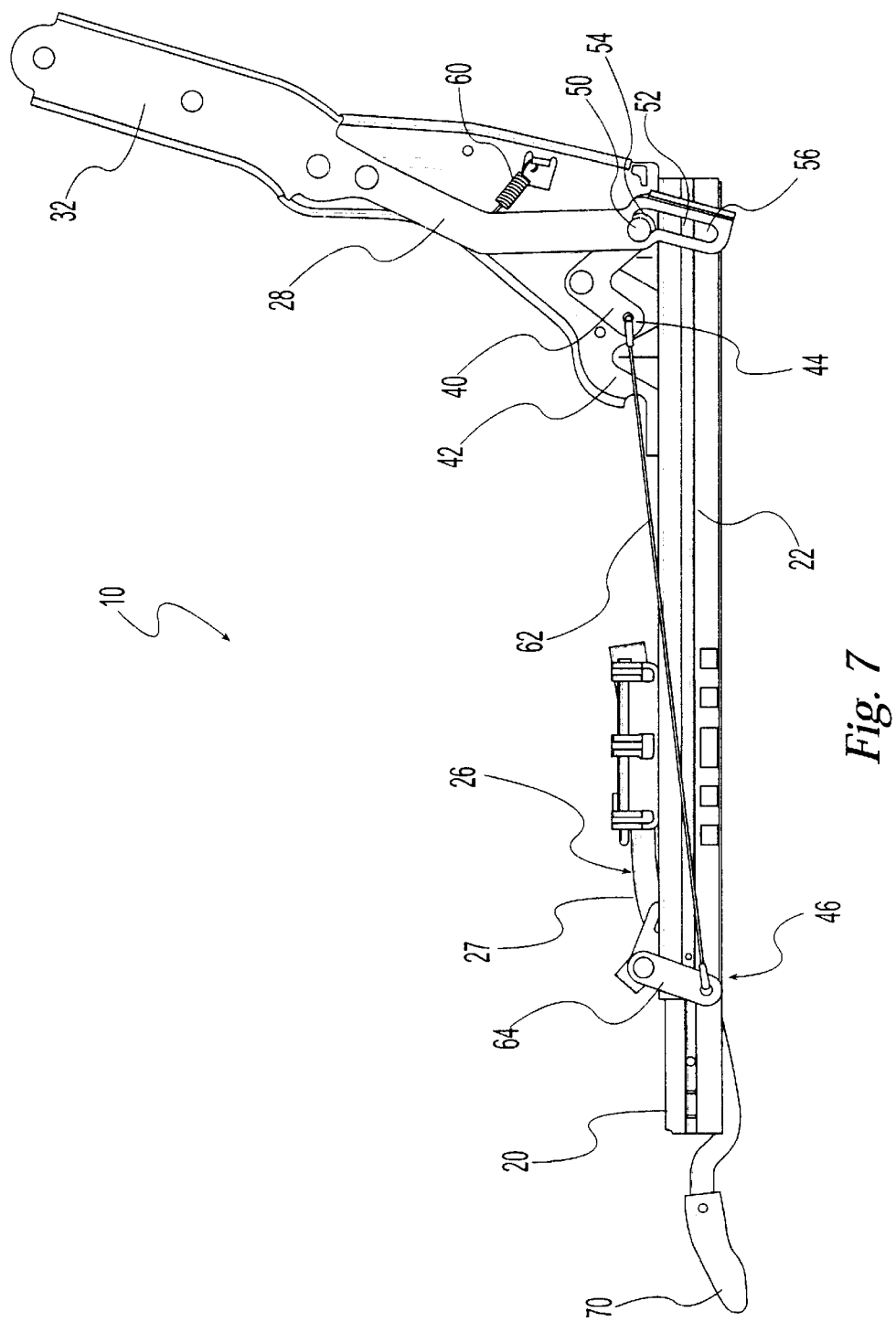

SEAT TRACK ASSEMBLY FOR FOLD AND FLIP SEAT

FIELD OF THE INVENTION

The present invention generally relates to an assembly for mounting a seat within a vehicle, and, more particularly, relates to a seat track assembly for mounting a seat for horizontal and pivotal movement with respect to the vehicle.

BACKGROUND OF THE INVENTION

It is generally well known to provide seat track assemblies for mounting seats within vehicles so that the seats are adjustable in a forward and rearward direction within the vehicle. It is also known to provide seat backs that are pivotal with respect to the seat bottom.

In some vehicles, the seat bottom can be pivoted forwardly into a vertical position and the seat back can be pivoted downwardly and forwardly into a horizontal position to increase available cargo space in a vehicle. When such seats are also provided with seat tracks so that the seats can be adjusted in a forward and rearward direction in the vehicle, the seat track assemblies are complex and require a great number of parts. The complexity of such seat track assemblies increases the assembly time and the overall cost of such seat assemblies.

Accordingly, there is a need in the art for a seat track assembly which provides a storage position for a vehicle seat, is less complex, and is relatively inexpensive to produce.

SUMMARY OF THE INVENTION

The present invention provides a seat track assembly for mounting a seat in a motor vehicle which overcomes at least some of the above-noted problems of the related art. According to the present invention, a seat track assembly comprises, in combination, a mount pivotable between a first position and a second position, a first track attached to the mount, and a second track operably engaging the first track. The second track is slideable between a full forward position and a full rearward position with respect to the first track. A seat back attachment arm is supported for pivotal movement relative to the second track. A locking device is supported on the second track and is moveable between a locked position where the locking device maintains the second track in a desired position relative to the first track and an unlocked position where the second track is movable relative to the first track. The seat track further comprises a release member and a bypass link. The release member is movable between a normal position and a release position where the release member maintains the locking device in the unlocked position such that the second track can move relative to the first track when the release member is in the release position. The bypass link is operatively connected to the seat back attachment arm and causes the release member to move to its release position when the seat back attachment arm is pivoted to a fully folded position and the second track is in a predetermined release position. The bypass link moves independently of the release member when the second track is in a predetermined memory position relative to the first track such that the bypass link enters a bypass position when the seat back attachment arm is in its fully folded position and the second track is in its predetermined memory position.

In one embodiment of the invention, the release member comprises a lever operatively connected to the locking device. The seat track assembly further comprises a rotation link pivotally supported with respect to a longitudinal access of the track assembly. The rotation link has a first end and a second end with the first end being operatively connected to the lever so that rotation of the rotation link will move the lever. The second end of the rotation link has a pin that is positioned in an L-shaped slot in the bypass link. Pivoting the seat back attachment arm to its fully folded position while the pin of the rotation link is positioned at a first end of the slot in the bypass link rotates the rotation link. A memory stop contacts the bypass link when the second track is in its predetermined memory position such that the bypass link moves independently of the release member to enter its bypass position when the seat back attachment arm is pivoted to its fully folded position. The pin on the second end of the rotation link is positioned at the second end of the L-shaped slot of the bypass link when the bypass link is in its bypass position.

In another embodiment, the release member is mounted to a mounting bracket attached to the second track. The release member comprises a cam plate pivotally mounted to the mounting bracket by a first pivot pin. The cam plate has a camming lobe that applies a lateral force to slideably engage the locking device to move the locking device between the locked and unlocked positions. The cam plate has a second pivot pin that is mounted to the cam plate in an arcuate slot on the bypass link so that the bypass link is slideable with respect to the second pivot pin. The bypass link is rotatably mounted to the mounting bracket by a third pivot pin, and the third pivot pin is slideably mounted in a linear slot in the mounting bracket. Linear movement of the third pivot pin in the linear slot from a first end to a second end causes the bypass link to rotate the cam plate. A memory stop contacts the bypass link when the second track is in its predetermined memory position such that the bypass link moves independently of the release member to enter its bypass position when the seat back attachment arm is pivoted to its fully folded position.

In another aspect of the present invention, a seat track assembly is provided that comprises, in combination, a mount pivotable between a first position and a second position, a first track attached to the mount, and a second track operably engaging the first track. The second track is slideable between a full forward position and a full rearward position with respect to the first track. A seat back attachment arm is supported for pivotal movement relative to the second track. A locking device is supported on the second track and is moveable between a locked position where the locking device maintains the second track in a desired position relative to the first track and an unlocked position where the second track is movable relative to the first track. Memory means are provided for (1) moving the locking device from its locked position to its unlocked position when the seat back attachment arm is pivoted to a fully folded position and the second track is in a predetermined release position relative to the first track and for (2) returning the locking device to the locked position when the second track is moved to a predetermined memory position relative to the first track. The memory means may also maintain the locking device in its locked position when the second track is in its predetermined memory position and the seat back attachment arm is pivoted to its fully folded position.

From the foregoing disclosure and the following more detailed description of various preferred embodiments it will be apparent to those skilled in the art that the present invention provides a significant advance in the technology and art of seat track assemblies. Particularly significant in this regard is the potential the invention affords for providing a seat track assembly for mounting a vehicle seat that has a storage position, that is less complex, and is relatively inexpensive to produce. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 7 side view of the seat track assembly shown in FIG. 5 shown with an opposite orientation, shown with the bypass link in its normal position, and shown with the seat back attachment arm in an upright position;

Figure 1:
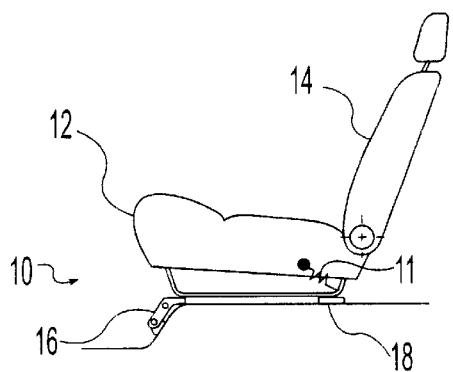
FIG. 1 a side plan view of a seat track assembly in accordance with the present invention.
Figure 2:
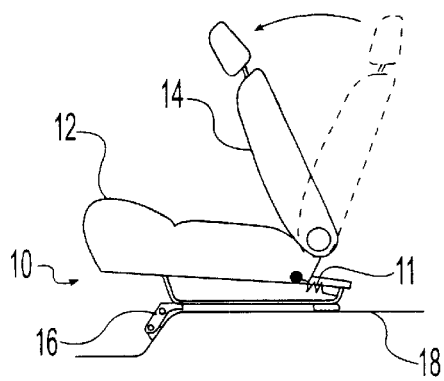
FIG. 2 is a side plan view of the seat track assembly of FIG. 1 showing the rotational movement of the seat back.
Figure 3:
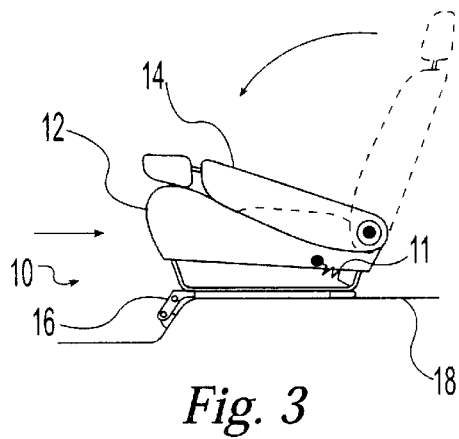
FIG. 3 is a side plan view of the seat track assembly of FIG. 1 shown with the seat back in a dumped position.
Figure 4:
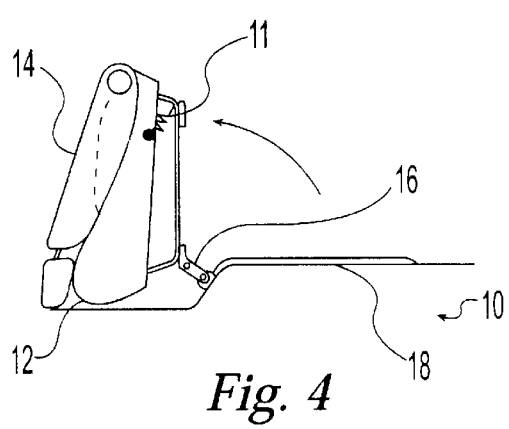
FIG. 4 is a side plan view of the seat track assembly of FIG. 1 shown with the seat track assembly in a storage position.

It should be understood that the appended drawings are not necessarily to scale, presenting a somewhat simplified representation of various preferred features illustrative of the basic principles of the invention. The specific design features of the seat track assembly as disclosed herein, including, for example, specific dimensions, orientations, and shapes of the bypass link and the release member will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the seat track assembly illustrated in the drawings. In general, up or upward refers to an upward direction in the plane of the paper in FIGS. 1–11 and down or downward refers to a downward direction in the plane of the paper in FIGS. 1–11. In general, fore or forward refers to a direction toward the front of the seat track assembly, that is, in a leftward direction in the plane of the paper in FIGS. 1–4, 7, 8, 9, and 12–14 and in a rightward direction in the plane of the paper in FIGS. 7A and 8A. Also in general, aft or rearward refers to a direction toward the rear of the seat track assembly, that is, in a rightward direction in the plane of the paper in FIGS. 1–4, 7, 8, 9, and 12–14 and in a leftward direction in the plane of the paper in FIGS. 7A and 8A.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat track assembly disclosed herein. The following detailed discussion of various alternative and preferred embodiments will illustrate the general principles of the invention with reference to a seat track assembly for mounting a seat in a motor vehicle. Other embodiments suitable for other applications will be readily apparent to those skilled in the art given the benefit of this disclosure.

FIGS. 1–4 illustrate a seat track assembly 10 for use in mounting a seat, such as that used in an automobile, according to the present invention that includes a seat bottom 12 and a seat back 14 that is pivotally supported for pivotal movement relative to the seat bottom 12. The seat track assembly 10 includes a mount 16 that is pivotally mounted to the vehicle floor 18 to allow for a "fold and flip" feature for "dumping" or pivoting the seat back 14 to a "dumped" or fully folded position into the seat bottom 12 and then pivoting the seat track assembly 10 forward in order to create a load floor or storage space where the seat was positioned. While the illustrated embodiments of the present invention are particularly adapted for use with a fold and flip seat, it is noted that the present invention can be utilized with any other seat assembly.

FIGS. 5–9 illustrate a seat track assembly 10 according to a first preferred embodiment of the invention. The seat track assembly 10 includes a mount 16 (FIG. 5), a first track 20, a second track 22, a locking device 24, a release member 26, a bypass link 28, a reset or memory stop 30 (FIGS. 5–5A), and a seat back attachment arm 32. The mount 16 is pivotal between a first position and a second position. As illustrated in FIGS. 1–4, the mount 16 may be pivotally mounted to a frame of a vehicle and is movable between a horizontal position and a vertical position that allows the seat track assembly 10 to be placed in a storage position.

In the first preferred embodiment, the seat track assembly 10 includes a first track 20 (FIG. 5) and a second track 22. The first track 20 is a lower track 20 and the second track 22 is an upper track 22 operatively engaging the first track 20 so that the second track 22 is slideable relative to the first track 20 between a full forward position and a full rearward position. The upper track 22 is used to mount a seat bottom 12 (FIGS. 1–4) so that the seat bottom 12 can be adjusted forwardly and rearwardly within a vehicle. The seat track assembly 10 preferably includes biasing means such as, for example, a spring 11 (FIGS. 1–4) for biasing the upper track 22 toward the full rearward position.

Figure 5:
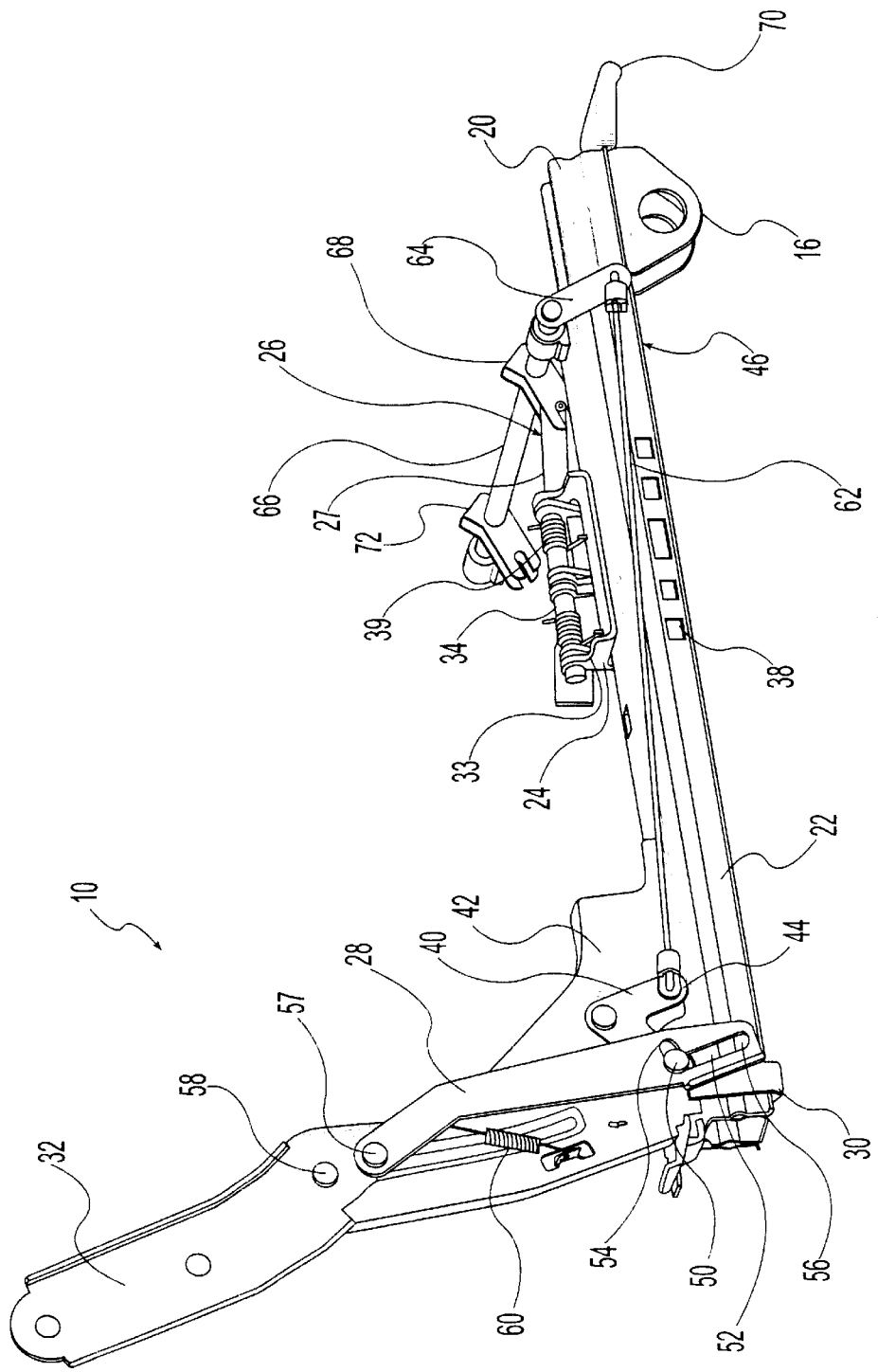
FIG. 5 is a perspective view of a seat track assembly according to one preferred embodiment of the present invention showing a memory stop contacting the bypass link.
Figure 5A:
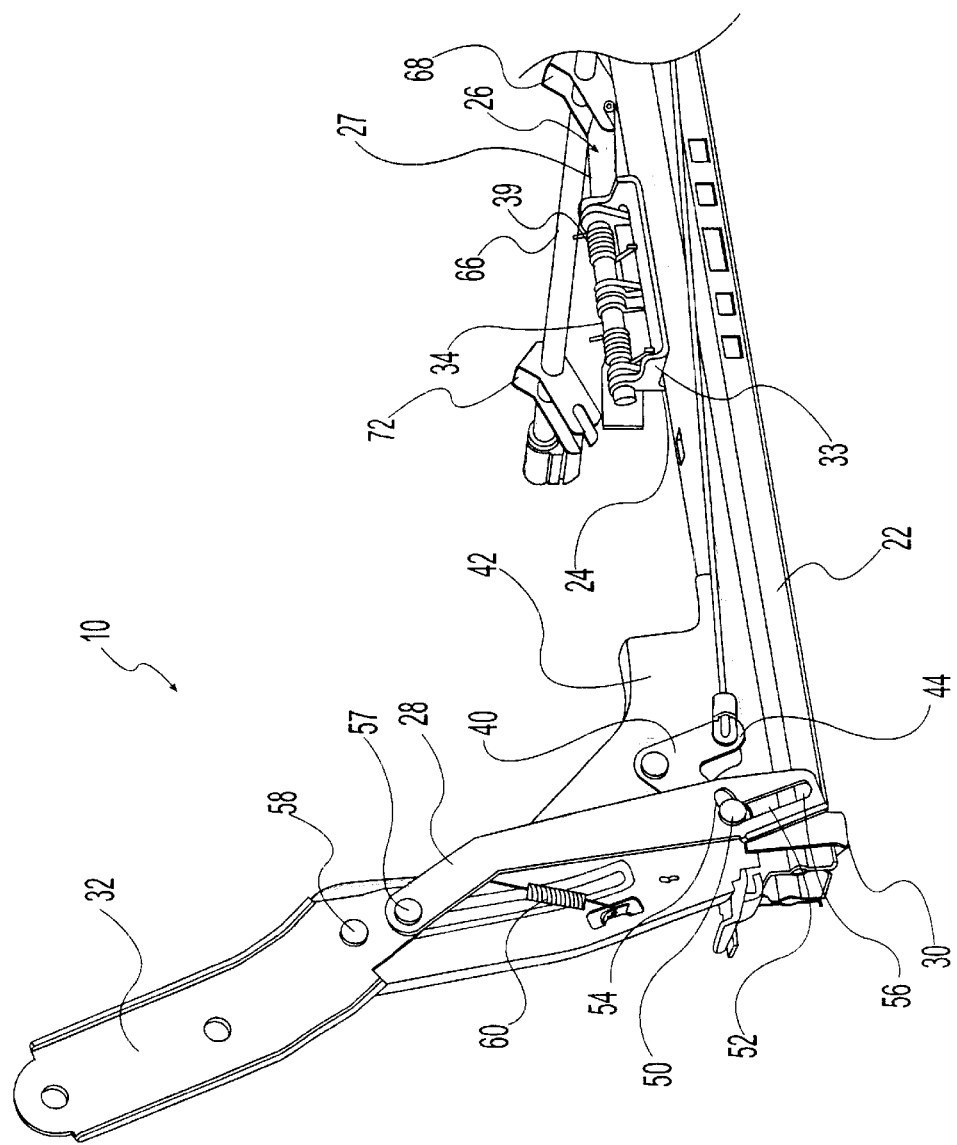
FIG. 5A is an enlarged perspective view of a portion of the seat track assembly shown in FIG. 5.
Figure 6:
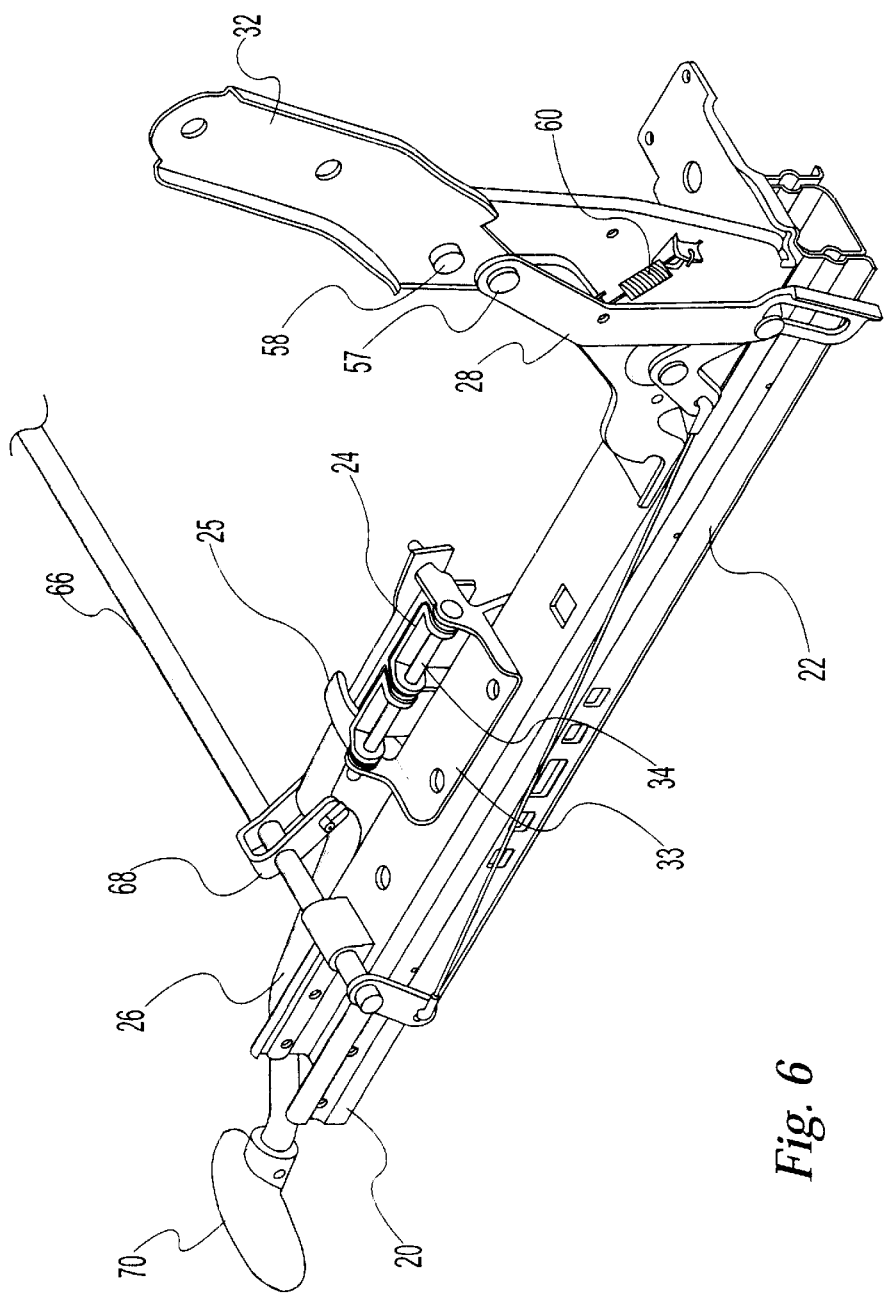
FIG. 6 is perspective view of the seat track assembly of FIG. 5 shown with an opposite orientation and shown from a different perspective.
Figure 6A:
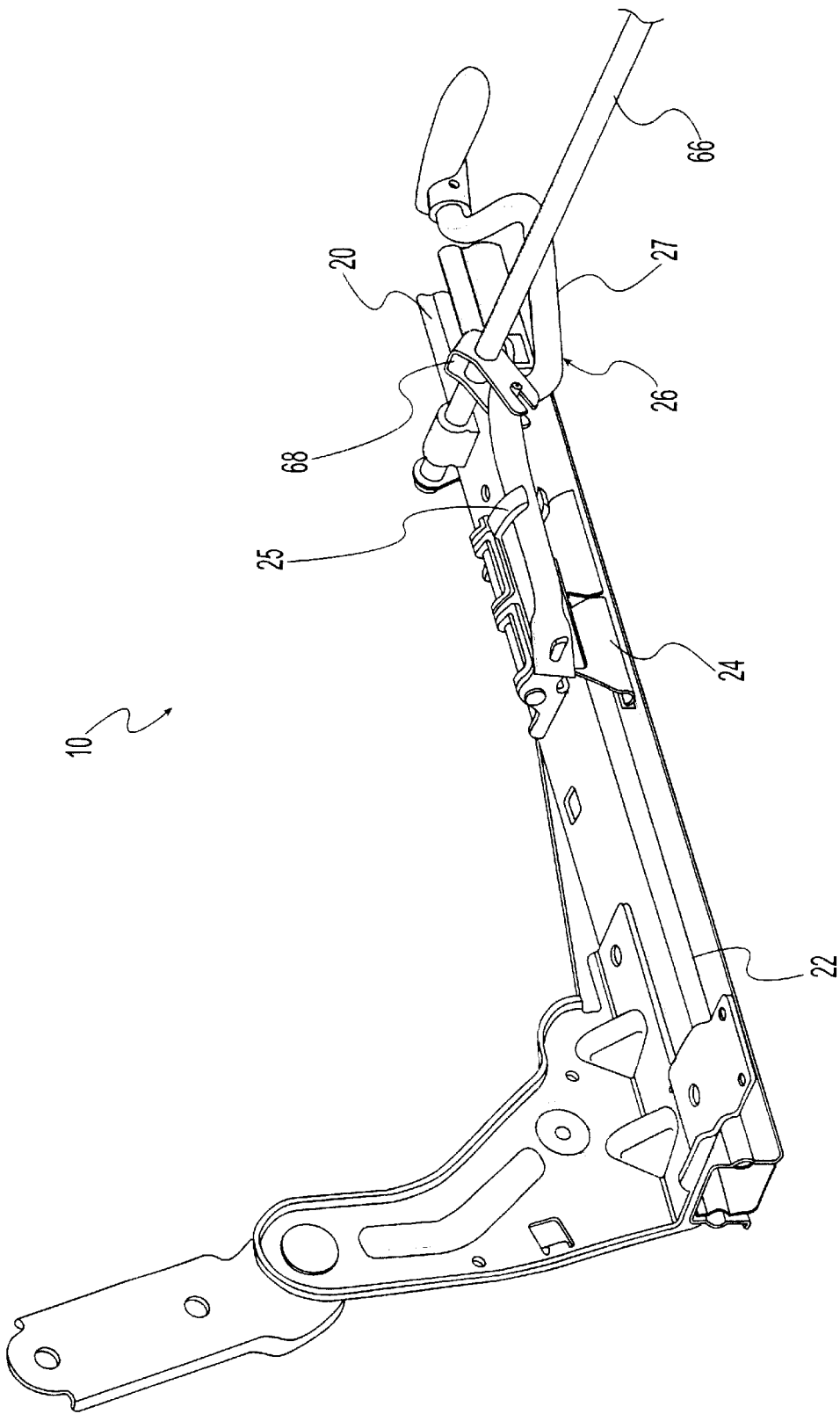
FIG. 6A is a perspective view of the seat track assembly FIG. 6 shown from the opposite side of seat track assembly.
Figure 7A:
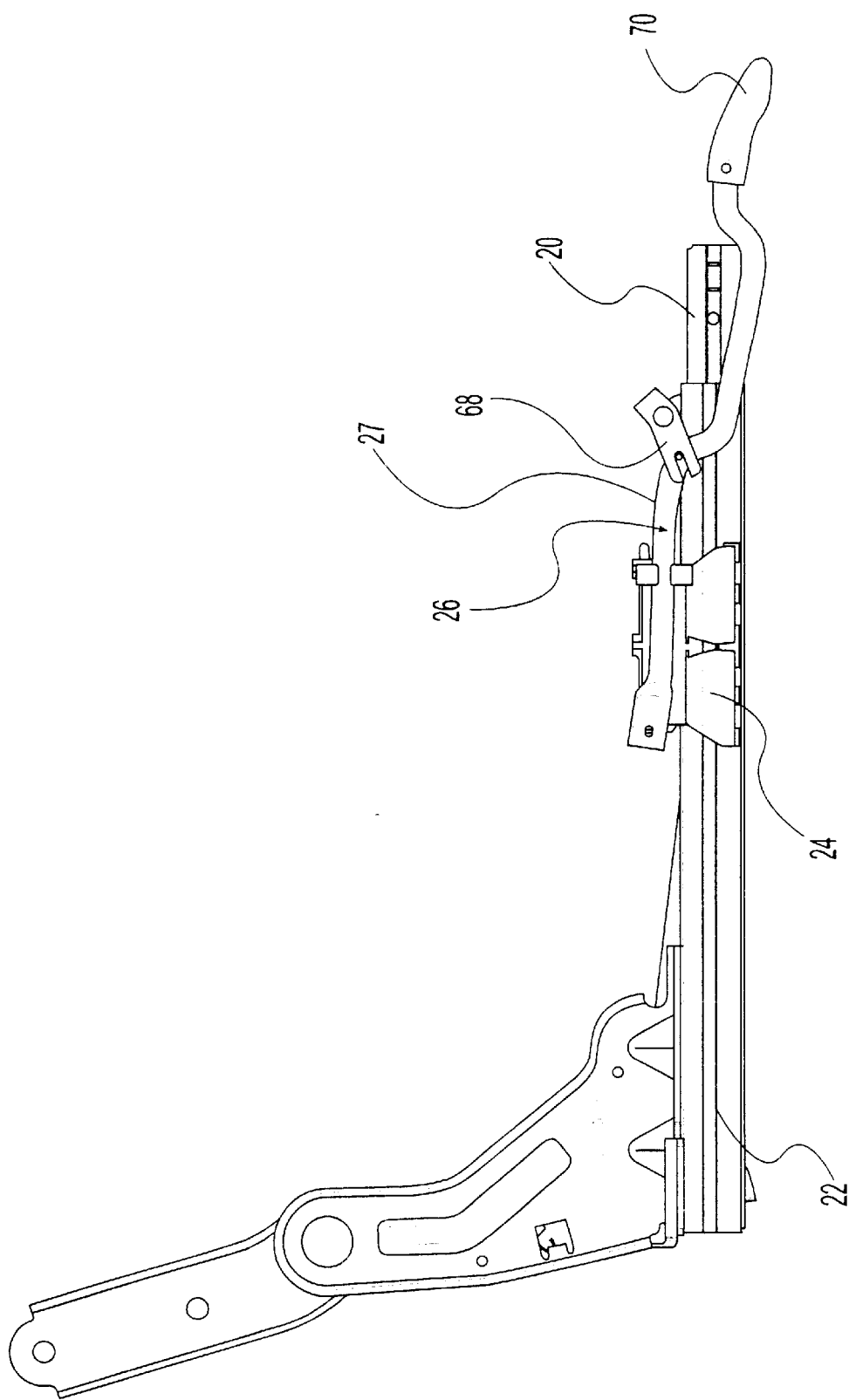
FIG 7A is a side view of the seat track assembly of FIG. 7 shown from the opposite side of the seat track assembly.
Figure 8:
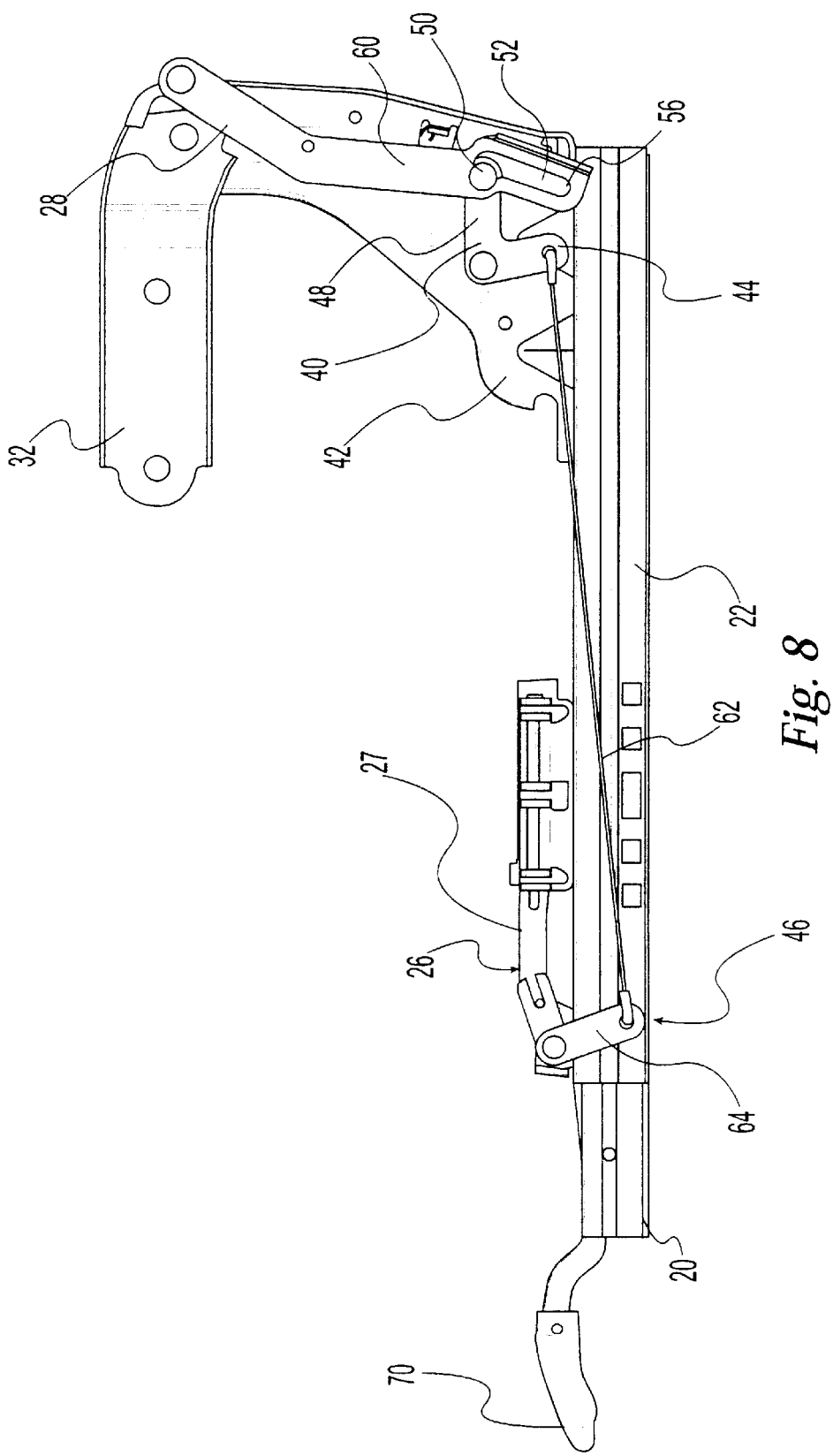
FIG. 8 is a side view of the seat track assembly shown in FIG. 5 shown with the seat back attachment in a fully folded position and the release member in a release position.
Figure 8A:
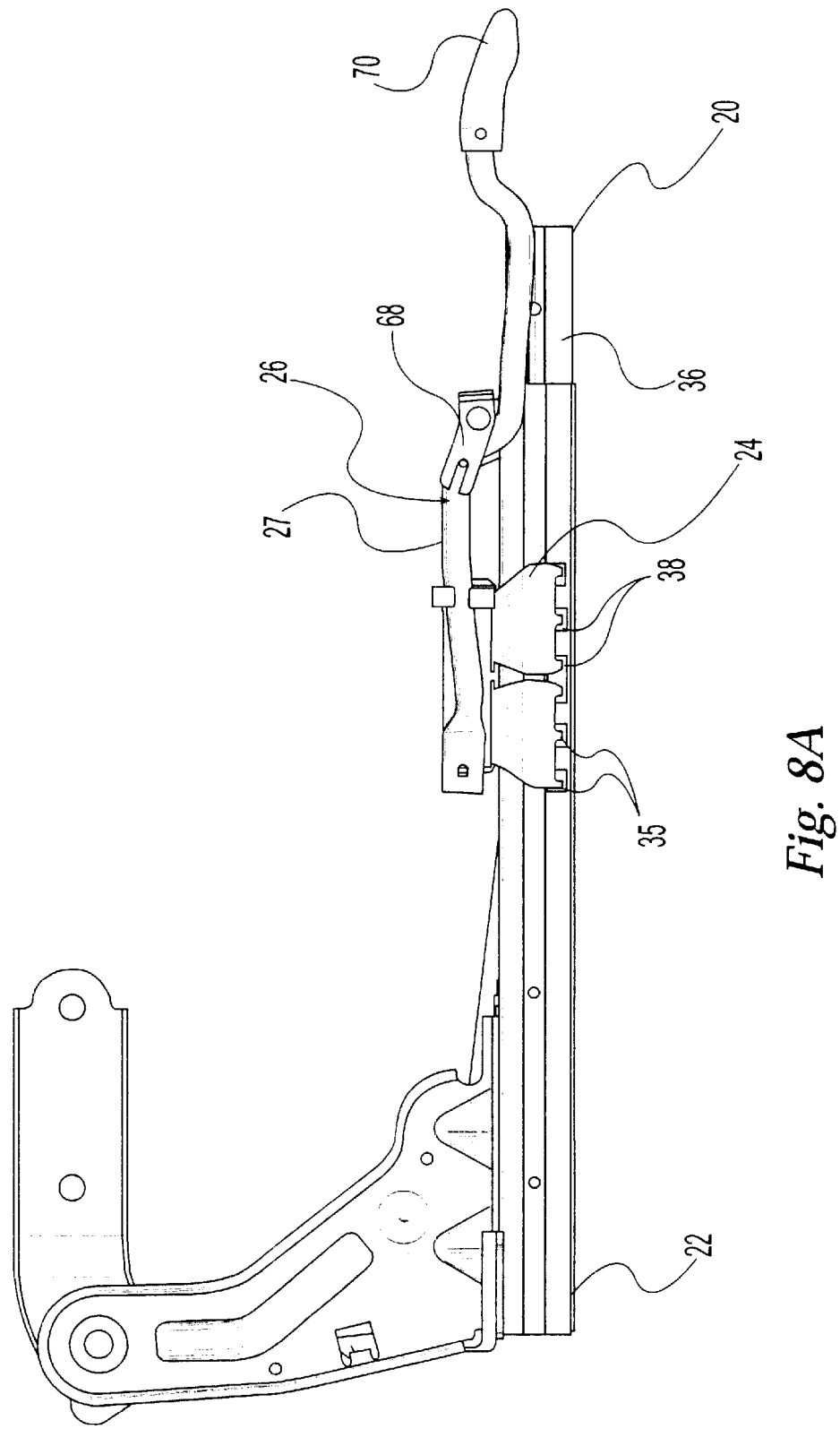
FIG. 8A is a side view of the seat track assembly of FIG. 8 shown from the opposite side of the seat track assembly.

As best illustrated in FIGS. 5–6A, 7A, and 8A, the locking device 24 is supported on the upper track 22 and is movable between a locked position, as illustrated in FIGS. 6A and 7A, where the locking device 24 maintains the upper track 22 in a desired position relative to the first track and an unlocked position, as illustrated in FIG. 8A, where the upper track 22 is movable relative to the first track 20. The locking device 24 is preferably mounted to a mounting bracket 33 using a pivot pin 34 so that the locking device 24 is rotatable about the pivot pin 34. The locking device 24 includes at least one locking pawl or tooth 35 (shown in FIG. 8A and shown in FIGS. 10–11 in connection with a second preferred embodiment described below). The lower track 20 includes a side wall 36 (FIG. 8A) having a plurality of slots 38 that receive at least one tooth 35 of the locking device 24 when the locking device 24 is in the locked position. As more fully discussed below, the locking device 24 is rotated to disengage the teeth 35 to place the locking device 24 in the unlocked position. As illustrated in the drawings, more than one locking device 24 may also be utilized in the present invention. The locking device 24 preferably includes a spring 39 (FIGS. 5–5A) or other means for biasing the locking device 24 toward its locked position.

In the first preferred embodiment, the release member 26 is a lever 27 operatively connected to the locking device 24 that selectively moves from a normal position where the locking device 24 is maintained in its locked position, as illustrated in FIGS. 5–7A, to a release position, as illustrated in FIGS. 8–8A, to move the locking device 24 out of its locked position and into its released position. As illustrated in FIGS. 6–6A, the lever 27 may be connected to the locking device 24 using a connection member 25 and may be pivotally connected to the mounting bracket 33.

As best illustrated in FIGS. 5–5A, the bypass link 28 is operatively connected to the seat back attachment arm 32. A rotation link 40 is pivotally mounted to a pivot bracket 42 supported on the second track 22. A first end 44 of the rotation link 40 is operatively connected to a link mechanism 46 so that rotation of the rotation link 40 will move the lever 27 to its release position to move the locking device 24 to its unlocked position. A second end 48 of the rotation link 40 includes a pin 50 that is positioned in a slot 52 on the bypass link 28 that includes a first end 54 and a second end 56. The slot 52 is preferably L-shaped, but other shapes of slots 52 will be readily apparent to those skilled in the art given the benefit of this disclosure. The bypass link 28 is pivotally mounted to the seat back attachment arm 32 on a pivot pin 57 so that when the seat back attachment arm 32 is pivoted forward on a pivot pin 58, the bypass link 28 will be carried upward and rearward with the pin 57. The bypass link 28 also includes a spring 60 for biasing the bypass link 28 toward a normal position, illustrated in FIG. 7, where the pin 50 on the rotation link 40 is positioned in the first end 54 of the slot 52 of the bypass link 28.

As illustrated in FIG. 7, the pin 50 on the rotation link 40 is positioned in the first end 54 of slot 52 of the bypass link 28 when the second track 22 is in any predetermined release position (that is, any position relative to the first track 20 other than a predetermined memory position). Rotation of the seat back attachment arm 32 to a fully folded position while the second track 22 is in any predetermined release position will cause the bypass link 28 to rotate the rotation link 40, as illustrated in FIG. 8. This rotation will cause link mechanism 46 to move the lever 27 to its release position. The first end 44 of the rotation link 40 will pull an attached rod or cable 62 thereby causing a second rotation link 64 attached to the rod or cable 62 to rotate a second rod 66 (FIGS. 5–6A). A carrier member 68 (FIGS. 5–6A) operatively attached to the second rod 66 rotates to move the lever 27 to its released position and thereby move the locking device 24 to its unlocked position. When the lever 27 has moved the locking device 24 to the unlocked position, the spring for biasing the second track 22 towards its rearward-most position will move the upper track 22 toward the full rearward position.

Figure 9:
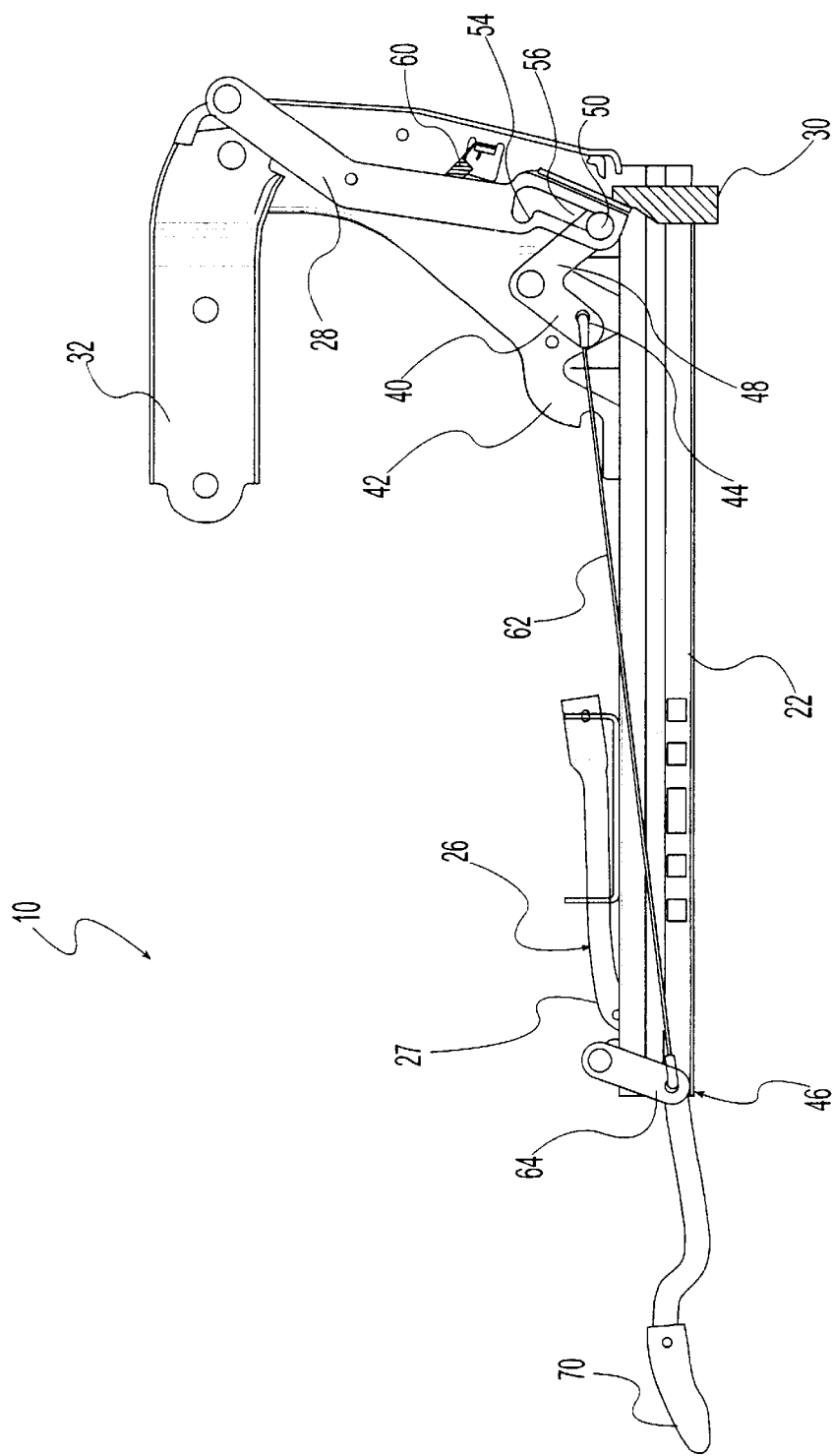
FIG. 9 is a side view of the seat track assembly shown in FIG. 5 shown with the seat back attachment arm in a fully folded position and the bypass link in a bypass position.
Figure 10:
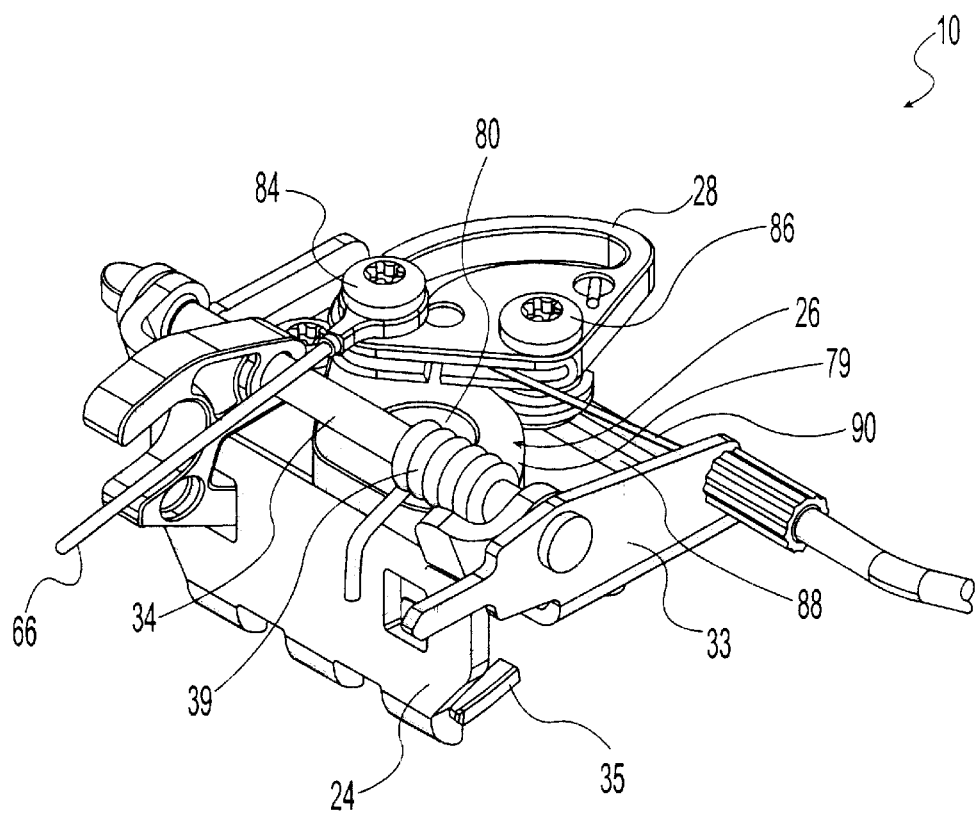
FIG. 10 is a perspective view of a seat track assembly according to a second embodiment of the present invention.
Figure 11:
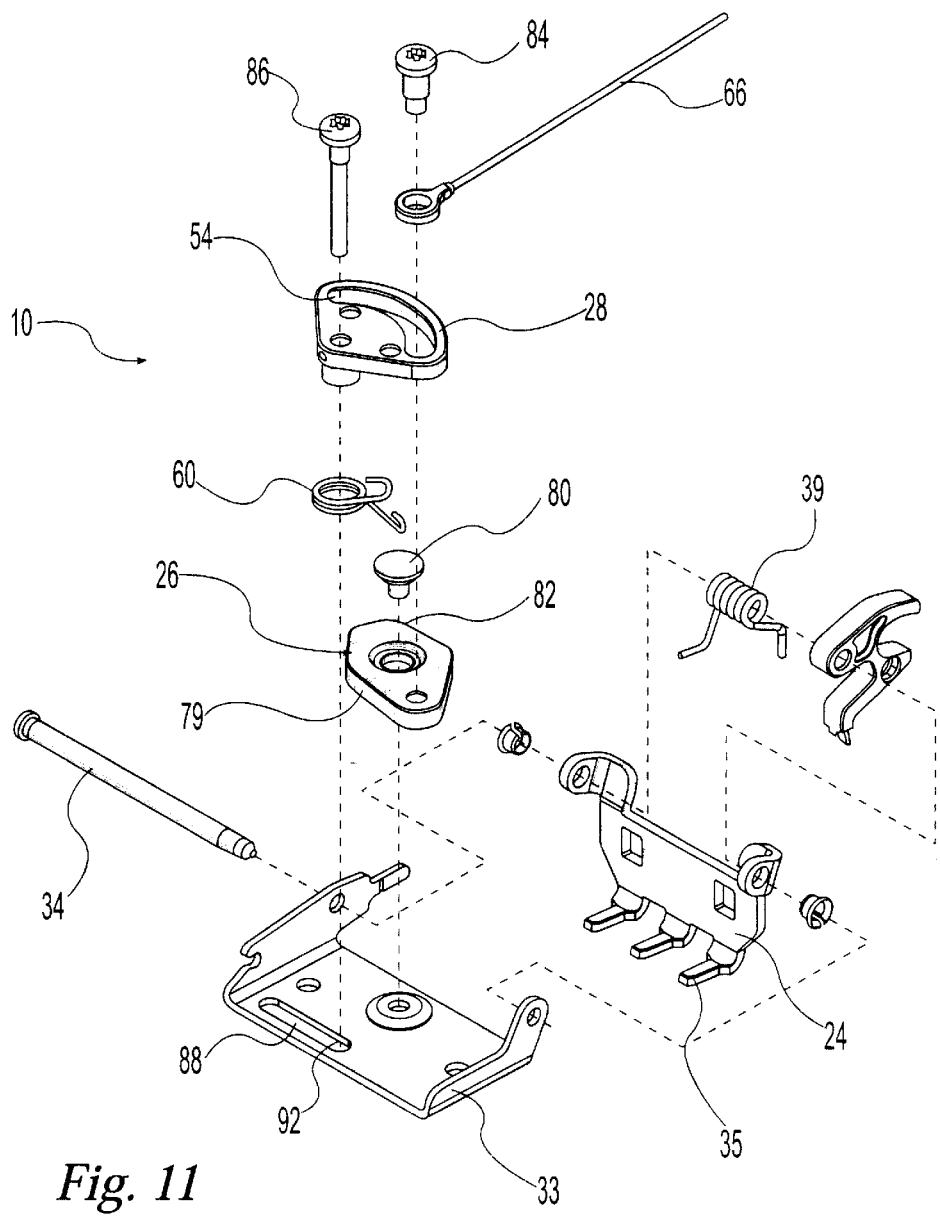
FIG. 11 is an exploded perspective view of the seat track assembly of FIG. 10.

As best illustrated in FIGS. 5–5A and 9, the memory stop 30 positioned on the first track 20 is designed to fluction, in conjunction with the bypass link 28, as memory means for (1) returning the locking device 24 to the locked position when the second track 22 is moved to the predetermined memory position relative to the first track 20 after the seat back 14 has been dumped and for (2) maintaining the locking device 24 in its locked position when the seat back 14 is dumped while the second track 22 is in its predetermined memory position. The memory stop 30 operates by engaging the bypass link 28 when the second track 22 is in its predetermined memory position relative to the first track 20. As shown in FIG. 5, when the seat back attachment arm 32 is in an upright position and the second track 22 is in the predetermined position, the memory stop 30 contacts the bypass link 28 so that the pin 50 on the rotation link 40 is not positioned in the first end 54 of the slot 52 on the bypass link 28. In this position, the rotation link 40 will not be rotated when the seat back attachment arm 32 is rotated from its upright position. Rather, when the seat back attachment arm 32 is rotated, the bypass link 28 moves independently of the rotation link 40, the lever 27, and the locking device 24 to enter a bypass position, as illustrated in FIG. 9. The bypass link 28 slides upwardly on an inclined surface of the memory stop 30 and the pin 50 on the rotation link 40 moves to the second end 56 of the slot 52 in the bypass link 28. In this manner, the rotation link 40 does not rotate and the locking device 24 is maintained in its locked position.

As described above, when the seat back attachment arm 32 has been rotated to its fully folded position when the second track 22 is in a predetermined release position, the locking device 24 is moved to its unlocked position and biasing means such as, for example, a spring, bias the second track 22 toward its fully rearward position. When the second track 22 approaches its predetermined memory position relative to the first track 20, the bypass link 28 will be contacted by the memory stop 30. As the second track 22 is biased toward the memory stop 30, the memory stop 30 forces the pin 50 on the rotation link 40 to move out of the first end 54 of the slot 52 on the bypass link 28. As the second track 22 is biased even closer to its predetermined position, the bypass link 28 slides up the memory stop 30 independently of the rotation link 40. At the same time, the pin 50 on the rotation link 40 moves toward the second end 56 of the slot 52 as the spring 39 biasing the locking device 24 to its locked position moves the locking device 24 back to its locked position to rotate the rotation link 40.

In the normal operation of the fold and flip feature of the preferred embodiment, the seat back 14 (and therefore the seat back attachment arm 32) will first be dumped or folded forward to a dumped or fully folded position while the second track 22 is in a predetermined release position. When the seat back 14 has reached the fully folded position, the locking device 24 has been released and the seat bottom 12 and second track 22 are biased toward the predetermined memory position relative to the first track 20 where the locking device 24 will be reengaged. The predetermined memory position of the second track 22 is usually in the full rearward position to optimize the packaging of the seat back 14 and seat bottom 12 when the seat track assembly 10 is folded. Once the locking device 24 has reentered its locked position, the seat track assembly 10 may be pivoted on a pivot pin or hinge (not shown) attached to the mount 16 to a storage position, thus allowing for storage room or a load floor where the seat track assembly 10 was previously positioned.

As best illustrated in FIGS. 6–9, the seat track assembly 10 may also include a second release means, such as, for example, a release handle 70 positioned at the front of the seat track assembly 10 for adjusting the position of the second track 22 relative to the first track 20. The release handle 70 is operatively connected to the lever 27 so that raising the release handle 70 will move the lever 27 to its release position so that the locking device 24 will move to its unlocked position.

The present invention may be used in connection with a single person seat or in connection with a multiple person bench seat where the seats have varying numbers of seat track assemblies 10. When multiple seat track assemblies 10 are used, the seat track assemblies 10 may include separate locking devices 24 that are supported on the upper tracks 22 and are independently controlled. Alternatively, multiple locking devices 24 could be slave mechanisms controlled by a first locking device 24 controlled by operation of the seat back 14. As illustrated in FIGS. 5–5A, the rod 66 includes a second carrier member 72 for controlling a slave mechanism on a second seat track assembly 10.

FIGS. 10–14 illustrate an alternative embodiment of a seat track assembly 10 according to the present invention. In the alternative preferred embodiment, parts analogous to those in the first preferred embodiment are indicated by the same numerals. While not shown in the drawings, the alternative embodiment includes a mount 16, a first track 20, a second track 22, a seat back attachment arm 32, and a memory stop 30. These parts may be similar to those of the first preferred embodiment as described above. As shown in the illustrations, the alternative preferred embodiment also comprises a locking device 24 (similar to the locking device 24 of the first preferred embodiment), a release member 26, a bypass link 28, and a mounting bracket 33.

The release member 26 of this preferred embodiment also selectively moves from a normal position to a release position to move the locking device 24 out of the locked position and maintain the locking device 24 in the unlocked position such that the upper track can move relative to the lower track. The release member 26 is preferably a cam plate 79 rotatably mounted to the mounting bracket 33 by a first pivot pin 80 so that the cam plate 79 is rotatable with respect to the upper track 22. The cam plate 79 includes a camming lobe 82 for slideably engaging the locking device 24 to apply a lateral force to the locking device 24. As the cam plate 79 rotates with respect to the upper track 22, there is a sliding engagement between the camming lobe 82 and the locking device 24 so that the cam plate 79 causes the locking device 24 to move from the locked position to the unlocked position.

The bypass link 28 is operatively connected to the seat back 14 (or a seat back attachment arm 32) by a control cable 90. A pin member 84 mounted on the cam plate 79 is placed through a slot 52 in the bypass link 28 so that the pin member 84 is slideable within the slot 52. The slot 52 is preferably arcuate in shape, but other shapes of slots 52 will be readily apparent to those skilled in the art given the benefit of this disclosure. The bypass link 28 is rotatably mounted to the mounting bracket 33 by a second pivot pin 86. The second pivot pin 86 is slideably mounted in a linear slot 88 in the mounting bracket 33 so that the second pivot pin 86 and the bypass link 28 are slideable with respect to the linear slot 88. The control cable 90 is attached to the bypass link 28 and to the seat back 14 (or seat back attachment arm 32) so that rotation of the seat back 14 to the fully folded position will pull the control cable 90 to move the bypass link 28 in the linear slot 88.

Figure 12:
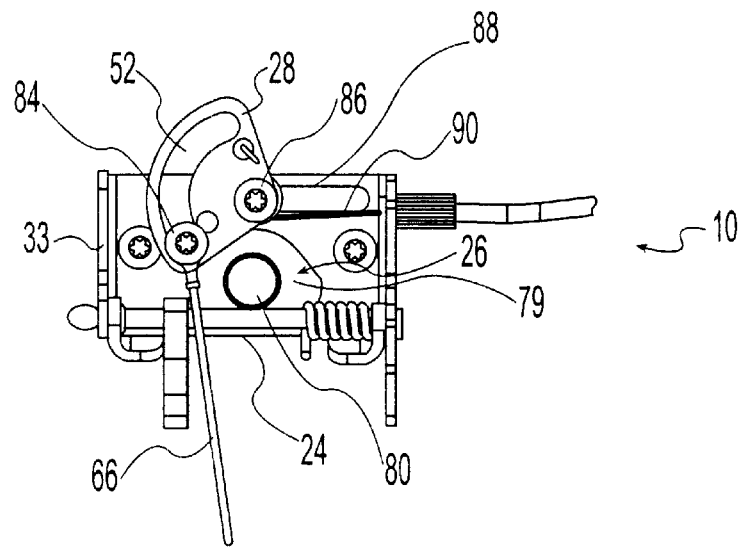
FIG. 12 is a top plan view of the seat track assembly of FIG. 10 shown with the bypass member in a normal position and the release member in its normal position.
Figure 13:
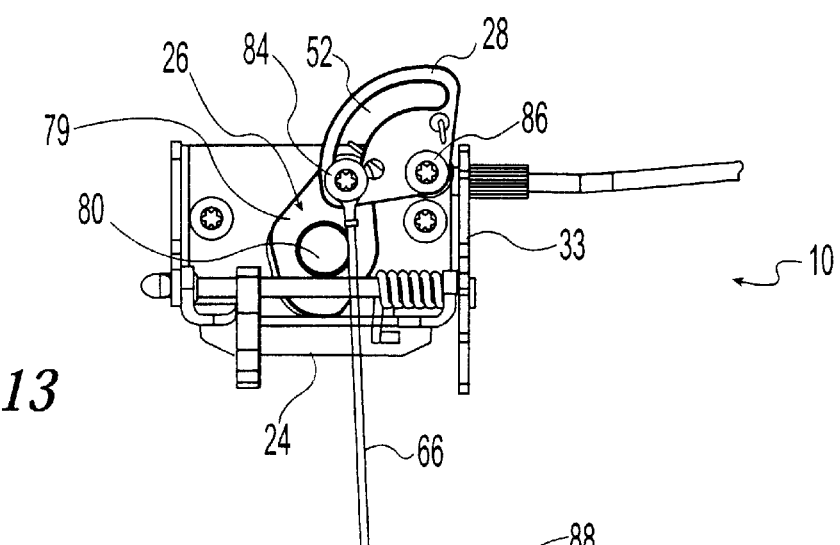
FIG. 13 is top plan view of the seat track assembly of FIG. 10 shown with the release member in a release position.

When the bypass link 28 is positioned in a first or normal position, as illustrated in FIG. 12, the cam plate 79 is maintained in its normal position and the locking device 24 is maintained in the locked position. As illustrated in FIG. 13, when the second track 22 is in any predetermined release position (that is, any position relative to the first track 20 other than the predetermined memory position) and the seat back 14 is dumped, the control cable 90 pulls the second pivot pin 86 linearly in the linear slot 88 and the bypass link 28 enters a second position. When the second pivot pin 86 slides in the linear slot 88, the bypass link 28 forces the pin member 84 and the attached cam plate 79 to rotate about pivot pin 80, thereby moving the locking device 24 from its locked position to its unlocked position. When the bypass link 28 rotates away from the locking device 24 on the second pivot pin 86, the pin member 84 remains at a first end 54 of arcuate slot 52, thereby forcing the cam plate 79 to rotate about the pivot pin 80.

Figure 14:
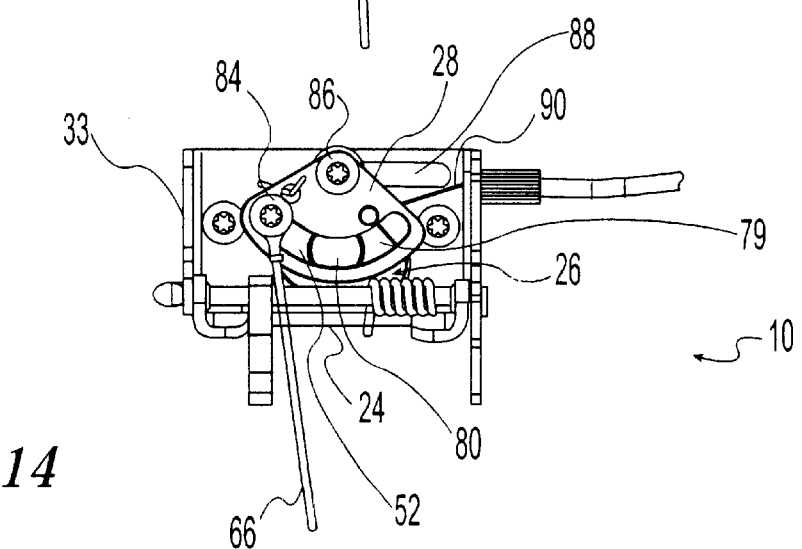
FIG. 14 is top plan view of the seat track assembly of FIG. 10 shown with the bypass member in a bypass position.

FIG. 14 illustrates a bypass position of the bypass link 28 wherein the cam plate 79 is maintained in its normal position and the locking device 24 is maintained in its locked position. The bypass position occurs when the second track 22 is in a predetermined memory position with respect to the first track 20 and the seat back 14 is dumped to pull the control cable. The memory stop 30 is positioned on the first track 20 so that the memory stop 30 contacts the second pivot pin when the second track 22 is moved to its predetermined memory position. The memory stop 30 prevents the second pivot pin from sliding in the linear slot 88 to achieve the second position (discussed above) when the seat back 14 is folded. When the control cable 90 is pulled and the second track 22 is in the predetermined memory position, the bypass link 28 is rotated independently of the cam plate 79 on the second pivot pin 86 towards the locking device 24. The pin member 84 attached to the cam plate 79 slides in the arcuate slot 52 of the bypass link 28 and the cam plate 79 remains in its normal position. The locking device 24 is maintained in its locked position.

The bypass position of the bypass link 28 also occurs when the second track 22 is moved to the predetermined position relative to the first track 20 after the seat back 14 has been dumped. The memory stop 30 will contact the second pivot pin 86 as the second track 22 moves toward its predetermined position. As the second track 22 moves closer to its predetermined memory position, the memory stop 30 prevents the second pivot pin 86 from moving with the second track 22 and moves the second pivot pin toward a first end 92 of the linear slot 88. Because the control cable 90 is still pulling the bypass link 28, the bypass link 28 moves from its second position to its bypass position. The spring 39 biasing the locking device 24 in its locked position moves the locking device 24 back to its locked position, thereby moving the cam plate 79 from its release position to its normal position.

The second preferred embodiment of the locking mechanism of the present invention also includes biasing means such as, for example, a spring 60, for biasing the bypass link 28 in its normal position. As discussed in connection with the first preferred embodiment, a rod or cable 66 may also be used to control a slave mechanism when multiple seat track assemblies 10 are used to mount a seat. The seat track assembly 10 may further comprise a second release member, such as, for example, a lever such as that described in connection with the first preferred embodiment to independently move the locking mechanism 24 to its unlocked position. The lever may have a release handle operatively attached to the lever and positioned at the front of the seat track assembly 10.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the bypass link and release member can have many different shapes and positions. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A seat track assembly comprising, in combination:
   a mount pivotable between a first position and a second position;
   a first track attached to the mount;
   a second track operably engaging the first track, the second track slideable between a full forward position and a full rearward position with respect to the first track;
   wherein orientation of the first track and the second track changes when the mount is pivoted between the first position and the second position;
   a seat back attachment arm supported for pivotal movement relative to the second track;
   a locking device supported on the second track, the locking device moveable between a locked position where the locking device maintains the second track in a desired position relative to the first track and an unlocked position where the second track is movable relative to the first track;
   a release member movable between a normal position and a release position, the release member maintaining the locking device in the unlocked position such that the second track can move relative to the first track when the release member is in the release position;
   a bypass link operatively connected to the seat back attachment arm, the bypass link causing the release member to move to the release position when the seat back attachment arm is pivoted to a fully folded position and the second track is in a predetermined release position, the bypass link moving independently of the release member when the second track is in a predetermined memory position relative to the first track such that the bypass link enters a bypass position when the seat back attachment arm is in the fully folded position and the second track is in the predetermined memory position; and
   whereby the first track and the second track are selectively movable between an operation position and a storage position with the locking device in the locked position by pivoting the mount when the seat back attachment arm is in the fully folded position and the second track is in the predetermined memory position.

2. The seat track assembly of claim 1 wherein a memory stop contacts the bypass link when the second track is in the predetermined memory position to allow the bypass link to move independently of the release member.

3. The seat track assembly of claim 1 further comprising biasing means for biasing the second track toward the full rearward position.

4. The locking mechanism of claim 1 further comprising a spring biasing the locking device toward the locked position.

5. The locking mechanism of claim 1 further comprising a spring biasing the bypass link toward a normal link position where the bypass link will cause the release member to move to the release position when the seat back attachment arm is pivoted to the fully folded position.

6. The seat track assembly of claim 1 wherein the release member comprises a lever operatively connected to the locking device.

7. The seat track assembly of claim 1 wherein the release member is mounted to a mounting bracket attached to the second track and wherein the release member comprises a cam plate pivotally mounted to the mounting bracket by a first pivot pin, the cam plate having a camming lobe that applies a lateral force to slideably engage the locking device to move the locking device between the locked and unlocked positions.

8. The locking mechanism of claim 1 wherein the predetermined memory position is at the full rearward position.

9. A seat track assembly comprising, in combination:
   a mount pivotable between a first position and a second position;
   a first track attached to the mount;
   a second track operably engaging the first track, the second track slideable between a full forward position and a full rearward position with respect to the first track;
   a seat back attachment arm supported for pivotal movement relative to the second track;
   a locking device supported on the second track, the locking device moveable between a locked position where the locking device maintains the second track in a desired position relative to the first track and an unlocked position where the second track is movable relative to the first track;
   a release member movable between a normal position and a release position, the release member maintaining the locking device in the unlocked position such that the second track can move relative to the first track when the release member is in the release position;
   a bypass link operatively connected to the seat back attachment arm, the bypass link causing the release member to move to the release position when the seat back attachment arm is pivoted to a fully folded position and the second track is in a predetermined release position, the bypass link moving independently of the release member when the second track is in a predetermined memory position relative to the first track such that the bypass link enters a bypass position when the seat back attachment arm is in the fully folded position and the second track is in the predetermined memory position;

wherein the release member comprises a lever operatively connected to the locking device:

a rotation link pivotally supported with respect to a longitudinal access of the track assembly, the rotation link having a first end and a second end, the first end operatively connected to the lever so that rotation of the rotation link will move the lever, the second end having a pin that is positioned in an L-shaped slot in the bypass link, the L-shaped slot having a first end and a second end;

wherein pivoting the seat back attachment arm to the fully folded position while the pin of the rotation link is positioned at the first end of the slot in the bypass link rotates the rotation link; and wherein a memory stop contacts the bypass link when the second track is in the predetermined memory position such that the bypass link moves independently of the release member to enter the bypass position when the seat back attachment arm is pivoted to the fully folded position, the pin on the second end of the rotation link being positioned at the second end of the L-shaped slot of the bypass link when the bypass link is in the bypass position.

10. A seat track assembly comprising, in combination:

a mount pivotable between a first position and a second position;

a first track attached to the mount;

a second track operably engaging the first track, the second track slideable between a full forward position and a full rearward position with respect to the first track;

a seat back attachment arm supported for pivotal movement relative to the second track;

a locking device supported on the second track, the locking device moveable between a locked position where the locking device maintains the second track in a desired position relative to the first track and an unlocked position where the second track is movable relative to the first track;

a release member movable between a normal position and a release position, the release member maintaining the locking device in the unlocked position such that the second track can move relative to the first track when the release member is in the release position;

a bypass link operatively connected to the seat back attachment arm, the bypass link causing the release member to move to the release position when the seat back attachment arm is pivoted to a fully folded position and the second track is in a predetermined release position, the bypass link moving independently of the release member when the second track is in a predetermined memory position relative to the first track such that the bypass link enters a bypass position when the seat back attachment arm is in the fully folded position and the second track is in the predetermined memory position;

wherein the release member is mounted to a mounting bracket attached to the second track;

wherein the release member comprises a cam plate pivotally mounted to the mounting bracket by a first pivot pin, the cam plate having a camming lobe that applies a lateral force to slideably engage the locking device to move the locking device between the locked and unlocked positions;

wherein the cam plate has a second pivot pin, the second pivot pin being mounted to the cam plate in an arcuate slot on the bypass link so that the bypass link is slideable with respect to the second pivot pin, the arcuate slot having a first end and a second end, the bypass link being rotatably mounted to the mounting bracket by a third pivot pin, the third pivot pin being slideably mounted in a linear slot in the mounting bracket, the linear slot having a first end and a second end;

wherein linear movement of the third pivot pin in the linear slot from the first end to the second end causes the bypass link to rotate the cam plate; and wherein a memory stop contacts the bypass link when the second track is in the predetermined memory position such that the bypass link moves independently of the release member to enter the bypass position when the seat back attachment arm is pivoted to the fully folded position, the second pivot pin of the cam plate being positioned at the second end of the arcuate slot of the bypass link when the bypass link is in the bypass position.

11. A seat track assembly comprising, in combination:

a mount pivotable between a first position and a second position;

a first track attached to the mount;

a second track operably engaging the first track, the second track slideable between a full forward position and a full rearward position with respect to the first track;

wherein orientation of the first track and the second track changes when the mount is pivoted between the first position and the second position;

a seat back attachment arm supported for pivotal movement relative to the second track;

a locking device supported on the second track, the locking device moveable between a locked position where the locking device maintains the second track in a desired position relative to the first track and an unlocked position where the second track is movable relative to the first track;

means for moving the locking device from the locked position to the unlocked position when the seat back attachment arm is pivoted to a fully folded position and the second track is in a predetermined release position relative to the first track and for returning the locking device to the locked position when the second track is moved to a predetermined memory position relative to the first track; and whereby the first track and the second track are selectively movable between an operation position and a storage position with the locking device in the locked position by pivoting the mount when the seat back attachment arm is in the fully folded position and the second track is in the predetermined memory position.

12. The seat track assembly of claim 11 wherein the moving and returning means maintain the locking device in the locked position when the second track is in the predetermined memory position and the seat back attachment arm is pivoted to the fully folded position.

13. The seat track assembly of claim 11 further comprising biasing means for biasing the second track toward the full rearward position.

14. The locking mechanism of claim 11 further comprising a spring biasing the locking device toward the locked position.

15. The locking mechanism of claim 11 wherein the predetermined memory position is at the full rearward position.

16. A seat track assembly comprising, in combination:
a mount pivotable between a first position and a second position;
a first track attached to the mount;
a second track operably engaging the first track, the second track slideable between a full forward position and a full rearward position with respect to the first track;
a seat back attachment arm supported for pivotal movement relative to the second track;
a locking device supported on the second track, the locking device moveable between a locked position where the locking device maintains the second track in a desired position relative to the first track and an unlocked position where the second track is movable relative to the first track;
means for moving the locking device from the locked position to the unlocked position when the seat back attachment arm is pivoted to a fully folded position and the second track is in a predetermined release position relative to the first track and for returning the locking device to the locked position when the second track is moved to a predetermined memory position relative to the first track;
wherein the moving means comprise:
a release member movable between a normal position and a release position, the release member maintaining the locking device in the unlocked position such that the second track can move relative to the first track when the release member is in the release position;
a bypass link operatively connected to the seat back attachment arm; and
a memory stop;
wherein pivoting the seat back attachment arm to the fully folded position while the second track is in the predetermined release position actuates the bypass link to move the release member from the normal position to the release position;
wherein movement of the second track to the predetermined memory position when the seat back attachment arm has been pivoted to the fully folded position causes the memory stop to contact the bypass link and move the bypass link to a bypass position where the release member is returned to the normal position; and
wherein the memory stop contacts the bypass link when the second track is in the predetermined memory position so that the bypass link is moved to a bypass position when the seat back attachment arm is pivoted to the filly folded position, thereby maintaining the locking device in the locked position.

17. The seat track assembly of claim 16, wherein the release member comprises a lever operatively connected to the locking device.

18. The seat track assembly of claim 17 further comprising a rotation link pivotally supported with respect to a longitudinal access of the track assembly, the rotation link having a first end and a second end, the first end operatively connected to the lever so that rotation of the rotation link will move the lever, the second end having a pin that is positioned in an L-shaped slot in the bypass link, the L-shaped slot having a first end and a second end;
wherein pivoting the seat back attachment arm to the filly folded position while the pin of the rotation link is positioned at the first end of the slot in the bypass link rotates the rotation link; and
wherein the memory stop contacts the bypass link when the second track is in the predetermined memory position such that the bypass link moves independently of the release member to enter the bypass position when the seat back attachment arm is pivoted to the fully folded position, the pin on the second end of the rotation link being positioned at the second end of the L-shaped slot of the bypass link when the bypass link is in the bypass position.

19. The seat track assembly of claim 16 wherein the release member is mounted to a mounting bracket attached to the second track and wherein the release member comprises a cam plate connected to the mounting bracket with a first pivot pin such that the cam plate is rotatable, the cam plate having a camming lobe that applies a lateral force to slideably engage the locking device to move the locking device between the locked and unlocked positions.

20. The seat track assembly of claim 19 wherein the cam plate has a second pivot pin, the second pivot pin being mounted to the cam plate in an arcuate slot on the bypass link so that the bypass link is slideable with respect to the second pivot pin, the arcuate slot having a first end and a second end, the bypass link being rotatably mounted to the mounting bracket by a third pivot pin, the third pivot pin being slideably mounted in a linear slot in the mounting bracket, the linear slot having a first end and a second end;
wherein linear movement of the third pivot pin in the linear slot from the first end to the second end causes the bypass link to rotate the cam plate; and
wherein the memory stop contacts the bypass link when the second track is in the predetermined memory position such that the bypass link moves independently of the release member to enter the bypass position when the seat back attachment arm is pivoted to the fully folded position, the second pivot pin of the cam plate being positioned at the second end of the arcuate slot of the bypass link when the bypass link is in the bypass position.

21. The locking mechanism of claim 16 further comprising a spring biasing the bypass link toward a normal position where the bypass link will cause the release member to move to the release position when the seat back attachment arm is pivoted to the fully folded position.

* * * * *

UNITED STATES PATENT AND TRADEMARK OFFICE
CERTIFICATE OF CORRECTION

PATENT NO. : 6,474,739 B1 Page 1 of 1
DATED : November 5, 2002
INVENTOR(S) : Richard Allen Lagerweij It is certified that error appears in the above-identified patent and that said Letters Patent is hereby corrected as shown below:

Title page,
Item [73], Assignee, should be corrected to read:
-- Dura Global Technologies, Inc. --

Signed and Sealed this

Thirty-first Day of August, 2004

JON W. DUDAS
*Director of the United States Patent and Trademark Office*